US005871330A

United States Patent [19]

Davenport

[11] Patent Number: 5,871,330

[45] Date of Patent: Feb. 16, 1999

[54] METHOD OF MOVING A VEHICLE FROM A FIRST LOCATION TO A SECOND LOCATION WITH A HOIST MECHANISM

[75] Inventor: Dale Davenport, Phoenix, Ariz.

[73] Assignee: The Heil Co., Chattanooga, Tenn.

[21] Appl. No.: 857,732

[22] Filed: May 16, 1997

[51] Int. Cl.[6] .................. B65G 69/00

[52] U.S. Cl. .................. 414/800; 180/209; 414/482; 414/787; 298/22 AE; 298/20 A

[58] Field of Search .................. 298/22 AE, 20 R, 298/20 A, 22 P, 21 R, 17.5, 17 R, 1 R; 280/402; 414/800, 809, 812, 563, 483, 482; 254/3 R, 38, 3 C, 35

[56] References Cited

U.S. PATENT DOCUMENTS

| | | | |
|---|---|---|---|
| 2,148,798 | 2/1939 | Barrett | 298/20 A |
| 2,465,244 | 3/1949 | Lutz | 298/20 A |
| 2,717,707 | 9/1955 | Martin | 298/20 A X |
| 2,853,341 | 9/1958 | Morse | 298/22 AE X |
| 5,368,121 | 11/1994 | Priefert | 180/209 |
| 5,551,824 | 9/1996 | Zanzig et al. | 298/22 AE X |

FOREIGN PATENT DOCUMENTS

| | | | |
|---|---|---|---|
| 972196 | 1/1951 | France | 298/20 A |

*Primary Examiner*—Frank E. Werner

*Attorney, Agent, or Firm*—Parsons & Goltry; Robert A. Parsons; Michael W. Goltry

[57] ABSTRACT

A method of moving a refuse collection vehicle from a first location to a second location, the refuse collection vehicle of a type having a towing vehicle, a semi-trailer and a hoist mechanism interconnecting the towing vehicle to the semi-trailer and operative for moving the semi-trailer between a normal lowered position and a hoisted position, the method including the steps of securing the towing vehicle in a first towing vehicle location, moving the semi-trailer from the normal lowered position to the hoisted position thereby moving the rear wheels of the semi-trailer from a first semi-trailer location to a second semi-trailer location, securing the semi-trailer in the second semi-trailer location, and moving the semi-trailer from the hoisted position to the normal lowered position thereby moving the towing vehicle in the forwardly direction from the first towing vehicle location to a second towing vehicle location thereby resulting in the movement of the refuse collection vehicle from the first location to the second location.

12 Claims, 3 Drawing Sheets

METHOD OF MOVING A VEHICLE FROM A FIRST LOCATION TO A SECOND LOCATION WITH A HOIST MECHANISM

BACKGROUND OF THE INVENTION

1. Field of the Invention

This invention relates generally to apparatus for collecting, transporting and depositing material.

More particularly, this invention relates to vehicles for collecting, transporting and depositing material.

In a further and more specific aspect, the instant invention relates to a vehicle including a towing vehicle and a semi-trailer for collecting, transporting and depositing material, the semi-trailer having a hoist mechanism for, among other things, moving the vehicle from a first location to a second location.

2. Prior Art

The collection and removal of refuse, the solid waste of a community, is a major municipal problem. For example, residential refuse is generated at an average rate of approximately two pounds per day per capita. Other waste, from commercial or industrial generators, typically add another pound. As accumulated, loose and uncompacted, the refuse has a density generally in the range of 150 to 300 pounds per cubic yard. For the health and welfare of the community, regular disposal is imperative.

Traditionally, residential refuse, including garbage, trash, and other waste materials were amassed and stored in containers of approximately 10 to 30 gallon capacity. On a regular basis, usually once or twice weekly, the containers were placed by the householder at a designated location for handling by the scheduled collection agency. Frequently designated locations were curb side and alley line. Not uncommonly, the refuse of a single residence, depending upon the number of occupants and the frequency of service, would occupy two or more containers, each weighing as much as 75 to 100 pounds. Commercial or industrial generators accumulated waste in larger, heavier containers.

Conventionally, these refuse containers were emptied into a refuse collection vehicle which transported the refuse to a disposal site. Disposal sites could be landfills, dumps, incinerators and the like. The conventional refuse collection method involved a mechanized unit supplemented with manual labor. The mechanized unit, or collection vehicle, included a refuse handling body mounted upon a truck chassis. Generally, the vehicle was attended by a crew of three or more. One of the crew, the driver, attended to operation of the vehicle while the others, known as collectors, brought the refuse to the vehicle.

Commonly, the vehicle included a hopper of conveniently low loading height into which the collectors emptied the containers. Means were provided for transferring and compacting the refuse from the hopper into the body. The body also included unloading means for ejecting the refuse at the disposal site.

Recently, considerable effort has been devoted to developing devices which increase the speed and efficiency with which refuse is collected. The current efforts are primarily directed towards automation of the collection process. These devices generally employ a self-loading device which engages, lifts, and dumps refuse containers into the refuse handling body. A wide variety of self-loading devices have been developed and are in current use. These include side mounted arms and front loading arms. The use of these devices greatly increases the rate and efficiency of collection.

While these self-loading devices greatly increase the rate at which refuse is collected, they fail to address pressing problems generated by increasing population, health concerns, and the increase in refuse volumes. Generally, these problems revolve around the transportation of the collected refuse. At this time, although refuse can be collected faster and easier than at any other time in history, disposal of this collected waste is an ever growing problem.

Typically, refuse is transported to a landfill for disposal. It is common for landfills to be located a significant distance from the collection area. This is especially true for large communities. The distance refuse must be transported is growing quickly as relatively nearby landfills are filled, and as regulations limit the number of available sites requiring the use of more distant landfills.

A major problem with transporting refuse to a distantly located landfill is the increased cost generated by the need to employ a highly specialized vehicle, developed for refuse collection, to haul refuse a great distance. A refuse collection vehicle is very specialized, requiring heavy and expensive equipment. As the weight of equipment used increases to increase the speed and efficiency with which refuse is collected, the amount of refuse an individual truck can carry is reduced. As a consequence, the cost of collecting each pound of refuse is increased due to a reduced payload, increased cost of the vehicle, and time spent transporting refuse instead of collecting it.

Innovators are attempting to deal with the necessity of transporting refuse a great distance, and several options have been developed. Trucks having a large carrying capacity are being produced. This approach, however, leads to an expensive truck which is relatively difficult to maneuver, reducing collection efficiency. A large refuse collection vehicle will lose time maneuvering and remaneuvering in order to reach a refuse container in a tight spot. This somewhat reduces the efficiency attained by the automated loading mechanism.

While the larger vehicles are capable of carrying a big load, all of the expensive, specialized equipment is inactive much of the time, and is actually a hindrance during transportation. The engine on the vehicle must also be correspondingly larger to transport the heavy loads to a distant disposal cite, adding to weight and expense of the vehicle. Simply increasing the size of the refuse carrying body carried by the truck chassis does not prevent the automatic loading mechanism from being idle while in transport. This is inefficient, wasting valuable collection time of expensive equipment.

In an attempt to eliminate the use of collection equipment for transportation of refuse to a disposal site, the use of transfer stations has been developed. Transfer stations are generally large shed-like structures located centrally of a collection area. Refuse collection vehicles collect a load, and travel a short distance to this central location where they deposit the refuse. The deposited refuse is then loaded into transpiration vehicles generally consisting of large open-topped tractor trailer rigs. Large expensive machinery transfers the deposited refuse into the transportation vehicles. These vehicles lacking the heavy self-loading mechanisms and built for long hauls, efficiently transport large volumes of material to distant disposal sites. Transfer stations allow refuse collection vehicles to make additional collection trips since very little time has been used transporting the refuse to the transfer station.

While larger and larger refuse collection vehicles and transportation vehicles are currently being employed to increase the amount of waste collected and transported to landfills, the increased amount of waste material carried by the refuse collection vehicles and transportation vehicles has been found to cause these vehicles to become stuck in holes, ruts, mud and the softly compacted dirt that drivers of these vehicles normally face with attempting to deposit waste at landfills. When these vehicles get stuck, it normally results in a time-intensive production to free the truck from its stuck position. In this regard, it is normally necessary to pull the stuck truck away from its stuck position with another truck. As a result, not only does the stuck truck lose valuable waste collection and/or transportation time, the second truck used to pull the stuck truck free also loses valuable waste collection and/or transportation time, or other useful work time.

It would be highly advantageous, therefore, to remedy the foregoing and other deficiencies inherent in the prior art.

Accordingly, it is an object of the present invention to provide a new and improved method of moving a refuse collection vehicle from a first stuck location to a second unstuck location.

Another object of the present invention is to provide a method of moving a refuse collection vehicle from a first stuck location to a second unstuck location that is easy to implement.

And another object of the present invention is to provided a method of moving a refuse collection vehicle from a first stuck location to a second unstuck location that is expedient.

Still another object of the present invention is to provide a method of moving a refuse collection vehicle from a first stuck location to a second unstuck location that is efficient.

Yet another object of the present invention is to provide a method of moving a refuse collection vehicle from a first stuck location to a second unstuck location that is convenient.

Yet still another object of the instant invention is the provision of limiting down time associated with a refuse collection vehicle becoming stuck in a hole, a rut, mud, soft dirt and other locations where the refuse collection vehicle may become stuck.

And a further object of the present invention is to provide a method of moving a refuse collection vehicle from a first stuck location to a second unstuck location that is safe.

And yet a further object of the present invention is to provide a method of moving a refuse collection vehicle from a first stuck location to a second unstuck location that requires no assistance from an additional vehicle.

SUMMARY OF THE INVENTION

Briefly, to achieve the desired objects of the instant invention in accordance with a preferred embodiment thereof, provided is a method of moving a refuse collection vehicle from a first stuck location to a second unstuck location. In accordance with the preferred teachings herein, the refuse collection vehicle is of a type having a towing vehicle, a semi-trailer and a hoist mechanism interconnecting the towing vehicle to the semi-trailer and operative for moving the semi-trailer between a normal lowered position defining a distance X between rear wheels of the semi-trailer and rear wheels of the towing vehicle, and a hoisted position defining a distance Y between the rear wheels of the semi-trailer and the rear wheels of the towing vehicle, distance X being greater than distance Y.

From a stuck location of refuse collection vehicle 10, the present method includes the steps of securing the towing vehicle in a first towing vehicle location, moving the semi-trailer from the normal lowered position to the hoisted position thereby moving the rear wheels of the semi-trailer from a first semi-trailer location to a second semi-trailer location a distance equal generally to the difference between the distance X and the distance Y. The method next includes the steps of securing the semi-trailer in the second semi-trailer location and moving the semi-trailer from the hoisted position to the normal lowered position thereby moving the towing vehicle in the forwardly direction from the first towing vehicle location to a second towing vehicle location a distance equal generally to the difference between the distance X and the distance Y, the total movement of the vehicle in the forwardly direction to an unstuck location being equal generally to the difference between the distance X and the distance Y.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which.

DETAILED DESCRIPTION OF THE PREFERRED EMBODIMENT

Figure 1:
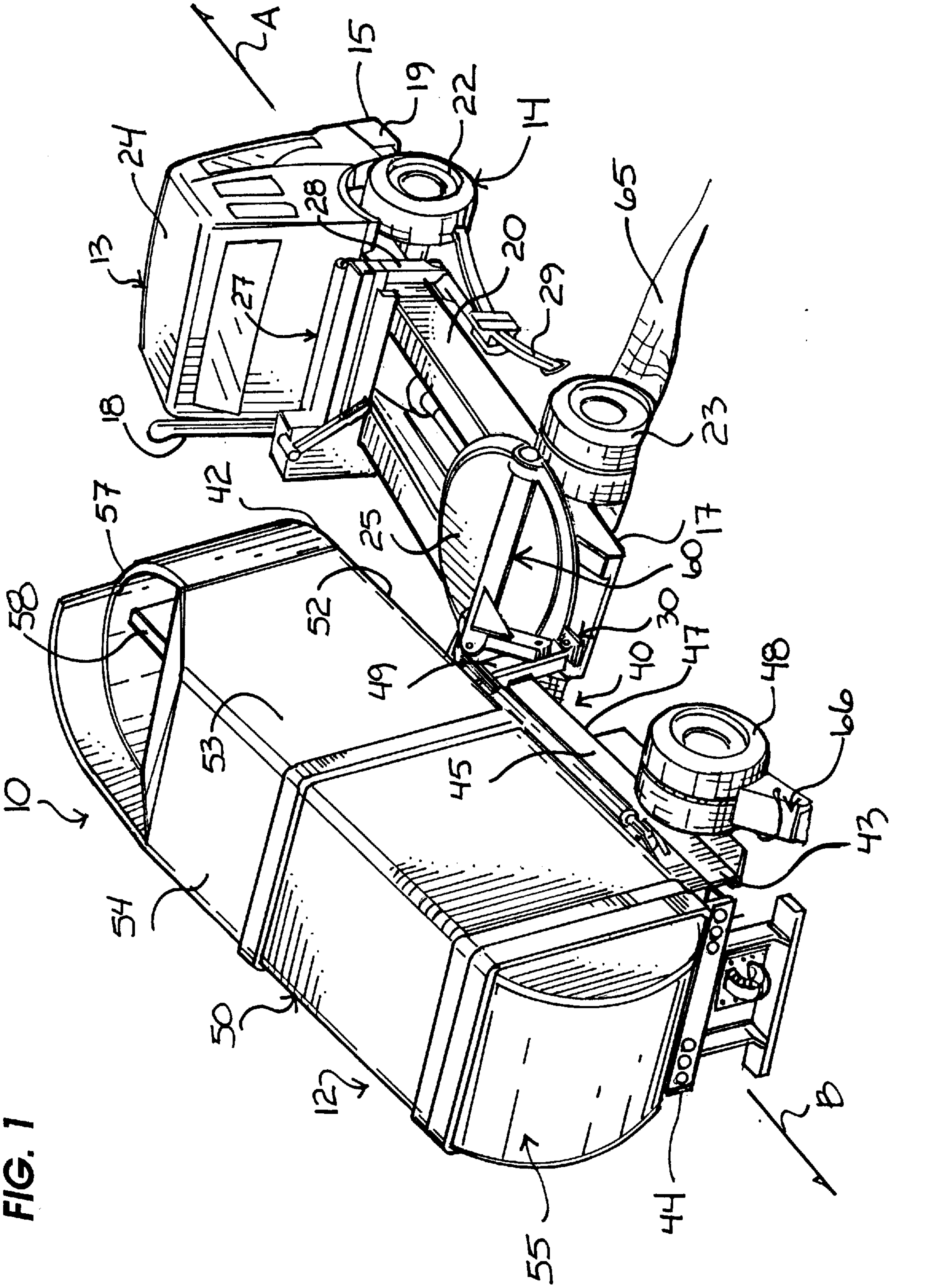
FIG. 1 illustrates a perspective view of an articulated refuse collection vehicle consisting of a semi-trailer coupled to a collection towing vehicle constructed in accordance with the teachings of the present invention.

Turning now to the drawings, in which like reference characters indicate corresponding elements throughout the several views, attention is first directed to FIG. 1 which illustrates an articulated refuse collection vehicle generally designated by the reference character 10. Articulated refuse collection vehicle 10 includes a semi-trailer 12 and a towing vehicle 13.

Figure 2:
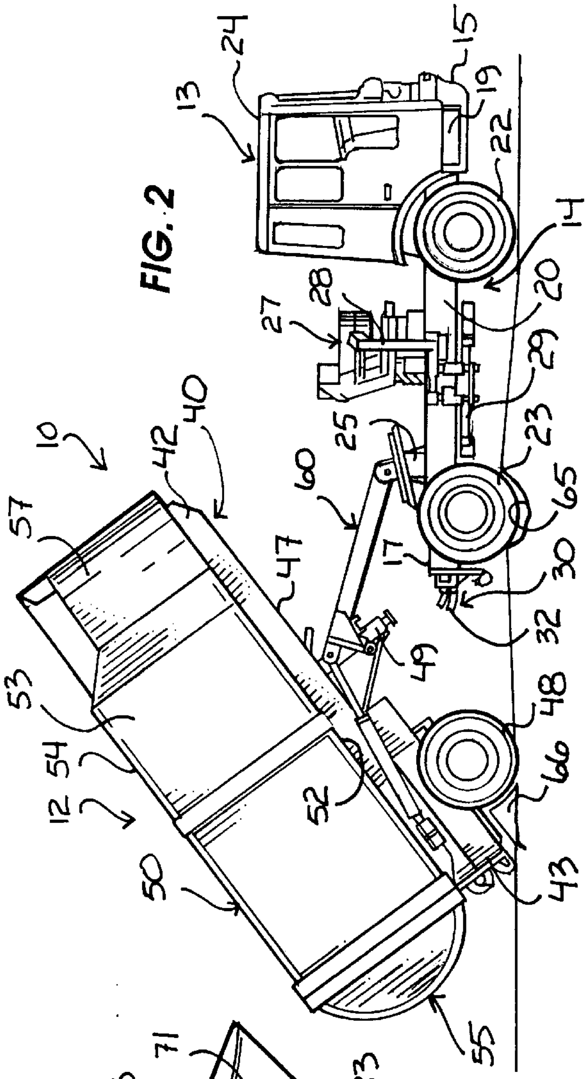
FIG. 2 is a side view of the refuse collection vehicle of FIG. 1 showing the semi-trailer as it would appear in a raised position, the refuse collection vehicle further being shown as it would appear in a stuck location with a brace positioned against rear wheels of the semi-trailer.
Figure 3:
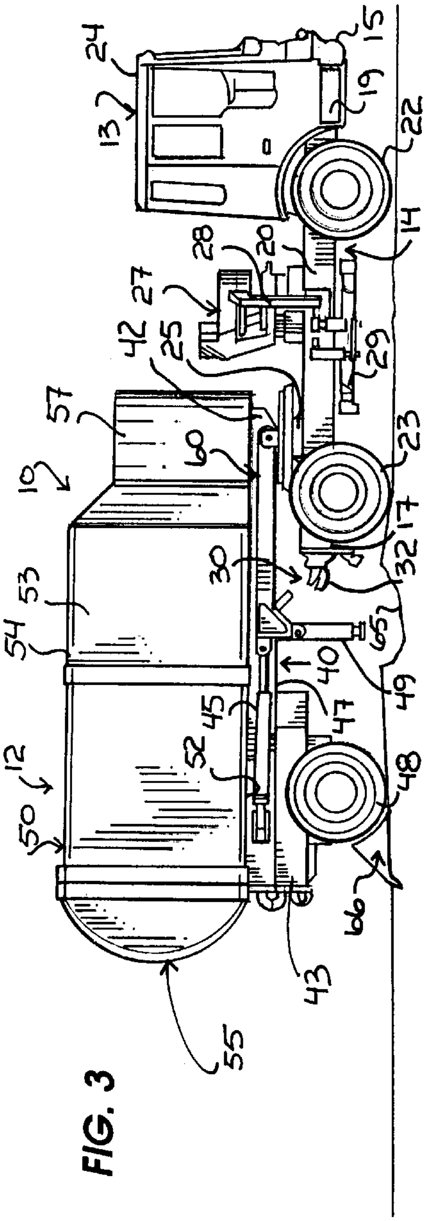
FIG. 3 is a side view of the refuse collection vehicle of FIG. 2 showing the semi-trailer as it would appear in a lowered position, the refuse collection vehicle further being shown as it would appear in an unstuck location with the brace positioned against rear wheels of the semi-trailer.

With continuing reference to FIG. 1 and additional reference to FIG. 2 and FIG. 3, towing vehicle 13 includes a chassis 14, which, for purposes of orientation in the ensuing discussion, is considered to have a forward end 15 directed in a forwardly direction, a rearward end 17 directed in a rearwardly direction, a left or street side 18 (shown only in FIG. 1) and a right or curb side 19. Chassis 14 includes a frame 20 supported above ground level by front wheels 22 and rear wheels 23. In accordance with conventional practice, front wheels 22 being steerable, provide directional control for the vehicle. Similarly, rear wheels 23 are caused to rotate in response to a conventional engine, transmission and drive train, not specifically illustrated, for propulsion of the unit. A cab 24, carried at forward end 15 of frame 20 provides for an enclosed driver's compartment including the conventional controls associated with the manipulation of the chassis as well as conventional controls associated with the loading and compacting equipment. A fifth wheel assembly 25 is carried at rearward end 17 of frame 20. Fifth wheel assembly 25 may be any conventional design well known to those skilled in the art, used in association with a semi-trailer.

A refuse loading mechanism generally designated 27 is carried by frame 20 intermediate cab 24 and fifth wheel assembly 25. In this specific example, refuse loading mechanism 27 consists of an extendible sidearm 28 terminating in a gripping member 29. Those skilled in the art will understand that various different types and designs of refuse loading mechanisms may be mounted on frame 20 for collection of refuse.

Various control media such as hydraulic, pneumatic, and electrical are conventionally supplied to various equipment by control conduits not specifically illustrated. However, as shown in FIG. 2, the control media are supplied to the various attachments such as semi-trailer 12, by a control assembly 30, consisting of an umbilical 32 (not shown in FIG. 1) made up of the individual conduits.

Still referring to FIG. 1 and FIG. 2, semi-trailer 12 includes a trailer chassis 40, which, for the purposes of orientation is considered to have a forward end 42, a rearward end 43, a left or street side 44 (shown only in FIG. 1), and a right or curb side 45. Trailer chassis 40 includes a frame 47 supported above ground level by rear wheels 48 and landing gear 49 carried intermediate forward end 42 and rearward end 43 of frame 47.

A refuse collection body, generally designated by the reference character 50 is carried upon chassis 40. Refuse collection body 50 is a hollow refuse receiving and storage receptacle generally defined by a bottom or lower horizontal panel 52, a pair of spaced apart upright side panels 53 (only one herein specifically illustrated), and a top or upper horizontal panel 54. At rearward end 43, the receptacle is normally closed by a tailgate assembly 55.

An arcuate hopper 57 is formed integral with the forward portion of refuse collection body 50 proximate forward end 42. Refuse, received by hopper 57 from refuse loading mechanism 27, is moved from hopper to the storage receptacle by a rotating compactor mechanism 58 (only shown in FIG. 1), or swinging platen, coupled to a pivot point within hopper 57 and rotating about a vertical axis.

Semi-trailer 12 also includes a hoist mechanism 60 having an end pivotally coupled to frame 47, and an opposing end terminating in a coupling assembly 62 including a king pin not visible, which is received by fifth wheel assembly 25 of collection towing vehicle 13. Hoist mechanism 60 is of a known variety disclosed in U.S. Pat. No. 5,551,824 entitled ARTICULATED REFUSE COLLECTION APPARATUS, of which is incorporated herein by reference. As a result, the various structural and functional characteristics of hoist mechanism 60 will not be herein specifically addressed. Nevertheless, hoist mechanism 60 is operative for moving or otherwise tilting refuse collection body 50 between a lowered position as shown in FIG. 3, and a hoisted, raised or dump position as shown in FIG. 2. Consistent with the teachings of U.S. Pat. No. 5,551,824, when in the hoisted position, the refuse carried in refuse collection body 50 of semi-trailer 12 may be dumped out an opened tailgate assembly 55. The angle of bottom 52 is sufficient, when hoisted, to allow refuse to slide out without requiring any additional mechanism for ejecting it through the tailgate assembly 55.

During the course of operation of refuse collection vehicle 10, front wheels 22 of towing vehicle 10, rear wheels 23 of towing vehicle 10 and/or rear wheels 48 of semi-trailer 12 may become mired, stuck or otherwise inhibited from moving either in a forwardly direction as indicated by the arrowed line A in FIG. 1 and/or a rearwardly direction as indicated by the arrowed line B in FIG. 1 thereby inhibiting refuse collection vehicle 10 from moving either in the forwardly direction and/or the rearwardly direction. Consistent with the preferred teachings of the present invention, hoist mechanism 60 may be advantageously employed for moving refuse collection vehicle 10 from a stuck location to an unstuck location thereby allowing refuse collection vehicle 10 to move in the forwardly direction and/or the rearwardly direction as desired.

Figures 5, 6, 7, 8, 9, 10, 11, 12, 13:
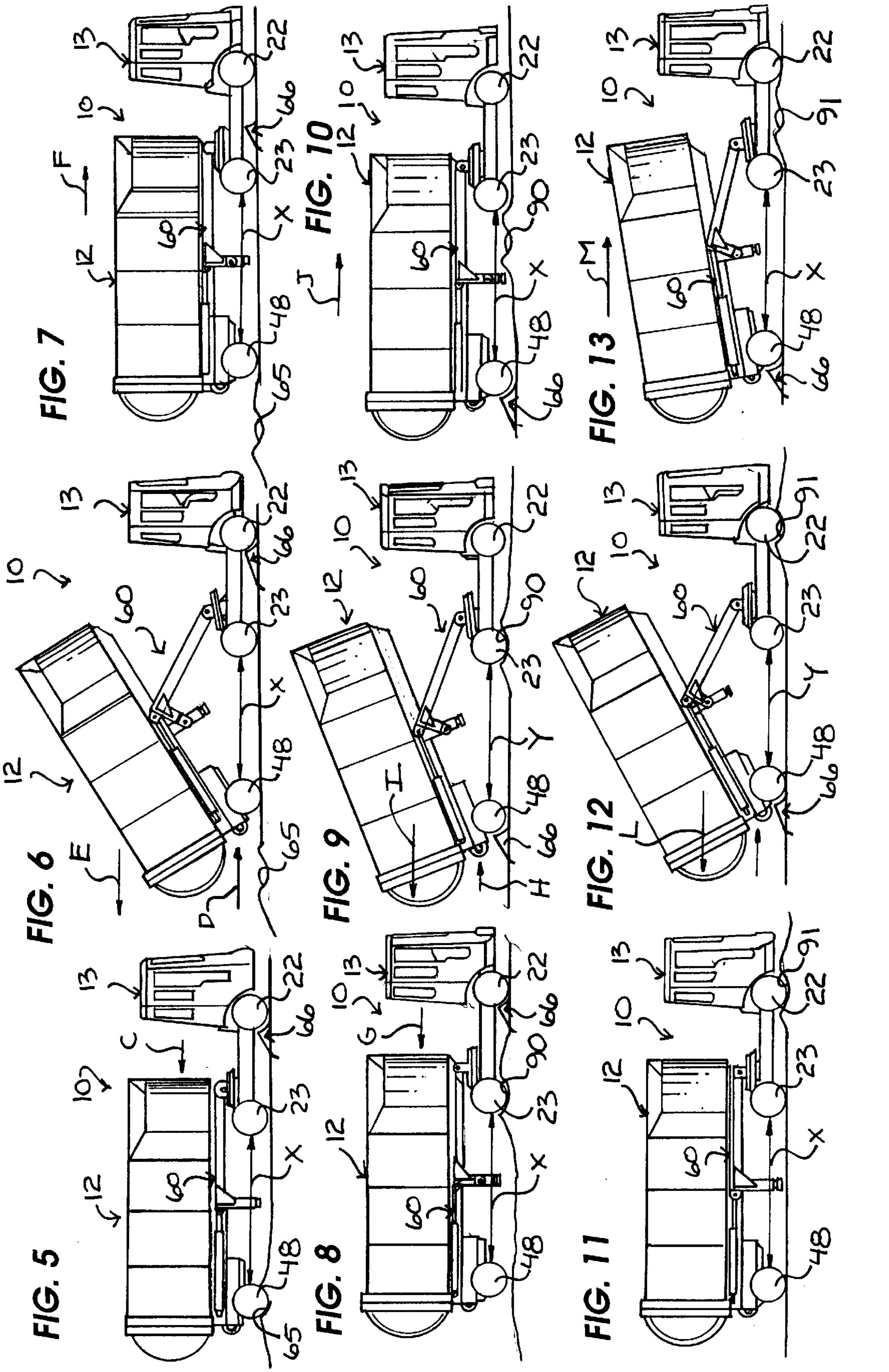
FIG. 5 is a side view of the refuse collection vehicle of FIG. 1 shown as it would appear in a stuck location, with rear wheels of the semi-trailer shown positioned within a trench and the semi-trailer shown in a lowered position.
FIG. 6 is a side view of the refuse collection vehicle very similar to the view of FIG. 5, the rear wheels of the semi-trailer shown positioned apart from the trench and the semi-trailer shown in a hoisted position.
FIG. 7 is a side view of the refuse collection vehicle very similar to the view of FIG. 5, the refuse collection vehicle shown in an unstuck position with rear wheels of the semi-trailer shown positioned apart from the trench and the semi-trailer shown in a lowered position.
FIG. 8 is a side view of the refuse collection vehicle of FIG. 1 shown as it would appear in a stuck location, with rear wheels of the towing vehicle shown positioned within a trench and the semi-trailer shown in a lowered position.
FIG. 9 is a side view of the refuse collection vehicle very similar to the view of FIG. 8, the semi-trailer shown in a hoisted position with a brace positioned against rear wheels of the semi-trailer.
FIG. 10 is a side view of the refuse collection vehicle very similar to the view of FIG. 8, the refuse collection vehicle shown in an unstuck position with rear wheels of the towing vehicle shown positioned apart from the trench and the semi-trailer shown in a lowered position.
FIG. 11 is a side view of the refuse collection vehicle of FIG. 1 shown as it would appear in a stuck location, with front wheels of the towing vehicle shown positioned within a trench and the semi-trailer shown in a lowered position.
FIG. 12 is a side view of the refuse collection vehicle very similar to the view of FIG. 11, the semi-trailer shown in a hoisted position with a brace positioned against rear wheels of the semi-trailer.
FIG. 13 is a side view of the refuse collection vehicle very similar to the view of FIG. 11, the refuse collection vehicle shown in an unstuck position with front wheels of the towing vehicle shown positioned apart from the trench and the semi-trailer shown in a lowered position.

In this regard, and with attention directed to FIG. 5, refuse collection vehicle 10 is shown as it would appear in a stuck location, with rear wheels 48 of semi-trailer 12 shown positioned within a trench 65 and semi-trailer 12 shown in a lowered position. In FIG. 5, because rear wheels 48 of semi-trailer 12 are positioned within trench 65, they are thus secured or otherwise inhibited from moving either in the forwardly direction or the rearwardly direction. To employ hoist mechanism 60 in a manner to move refuse collection vehicle 10 from the stuck location to an unstuck location, it may be desirable first to secure towing vehicle 10 for inhibiting towing vehicle 10 from moving in the rearwardly direction as semi-trailer is moved from the lowered position to the hoisted position, for reasons presently to appear. To secure towing vehicle from moving in the rearwardly direction, a brace 66 may be positioned behind, or otherwise rearwardly of, one or both of rear wheels 23 of towing vehicle 13, or one or both of the front wheels 22 of towing vehicle 13 as shown in FIG. 5.

Figure 4:
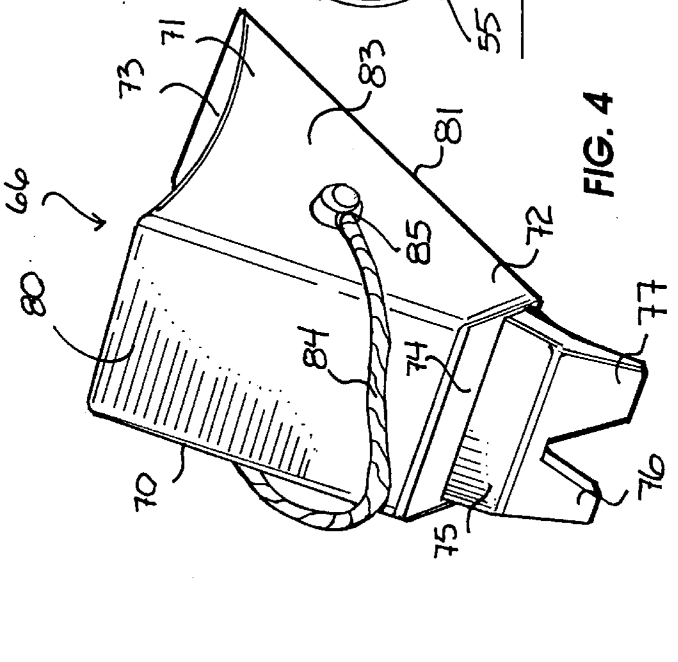
FIG. 4 is a perspective view of the brace first shown in FIG. 2.

With momentary reference to FIG. 4, brace 66, preferably constructed of a substantially rigid material such as a selected metal or other selected materials having similar structural and functional characteristics, includes a body 70 having a generally triangular cross section. Body 70 of brace 66 includes a forward end 71 and a rearward end 72, body 70 tapering from the forward end 71 to rearward end 72. Forward end 71 includes a substantially arcuate engagement surface 73 preferably sized to generally conform to the curvature of each of the front wheels 22 and rear wheels 23 of towing vehicle 13, and the rear wheels 48 of semi-trailer 12. Because the curvature of the front wheels 22 and rear wheels 23 of towing vehicle 13, and the rear wheels 48 of semi-trailer 12 may vary depending upon size, brace 66 may also be constructed of varying sizes. Rearward end 72, having a width less than the width of forward end 71, includes a forward surface 74 having a forked element 75 extending outwardly therefrom and having a pair of forks 76 and 77 extending outwardly and somewhat downwardly. Body 70 of brace 66 further includes an upper surface 80 and a lower surface 81 which converged outwardly from forward end 71 to rearward end 72, and opposed side surfaces 83 (only one herein specifically shown). Further included is a handle 84 constructed of rope or other suitable material and having outer ends 85 (only one shown), each of which is coupled to a respective side surface 83 of body 70 with handle 84 overlying upper surface 80 so as to be easily grasp. Although handle 84 is not an essential element of the present invention, it may be provided for allowing a user to grasp for facilitating easy transport brace 66 from place to place as desired.

In operation, brace 66 may be placed behind, or otherwise rearwardly of, a selected one of the front wheels 22 and/or rear wheels 23 of towing vehicle 13, and/or a selected one of the rear wheels 48 of semi-trailer 12 as required by a user for securing or otherwise inhibiting the one of the selected wheels from moving in the rearwardly direction corresponding the arrowed line B in FIG. 1. To position brace 66 against a selected wheel, brace 66 is designed to be placed behind a selected wheel with the lower surface 81 bearing against the ground and the substantially arcuate engagement surface 73 positioned in abutting engagement against the selected wheel, the substantially arcuate engagement surface 73 generally conforming to the outer surface of the selected wheel and forked element 75 extending in the rearwardly direction with forks 76 and 77 in engagement with the ground, a configuration of which may be easily seen in FIG. 1 showing the brace positioned rearwardly of a pair rear wheels 48 of semi-trailer 12.

With attention directed back to FIG. 5, brace 66 is shown positioned behind one of the front wheels 22 of towing vehicle in a manner consistent with that previously described, thereby securing towing vehicle 13 in a first towing vehicle location for inhibiting towing vehicle 13 from moving in the rearwardly direction as indicated by the arrowed line C in FIG. 5. Once towing vehicle 13 is properly secured in the first towing vehicle location, semi-trailer 12 may then be moved from a first semi-trailer location via hoist mechanism 60 from the lowered position in FIG. 5 to the raised or hoisted position as shown in FIG. 7. In the lowered position as shown in FIG. 5, the distance between the rear wheels 48 of semi-trailer 12 and the rear wheels 23 of towing vehicle 13 is generally defined by a distance X. However, in the raised or hoisted position as shown in FIG. 6, the distance between the rear wheels 48 of semi-trailer 12 and the rear wheels 23 of towing vehicle 13 is generally defined by a distance Y, distance X being greater than distance Y. Thus, with towing vehicle secured in the first towing vehicle location via brace 66, upon actuation of hoist mechanism 60 from the lowered position of semi-trailer 12, rear wheels 48 of semi-trailer 12 are pulled forwardly toward the rear wheels 23 of towing vehicle 13 and out of trench 65 in the direction indicated by the arrowed line D in FIG. 6 until semi-trailer 12 is positioned in a second semi-trailer location defined as the hoisted position of semi-trailer 12 with the rear wheels 48 of semi-trailer 12 located apart from trench 65, the distance between the rear wheels 48 of semi-trailer 12 and the rear wheels 23 of towing vehicle 13 being defined by distance Y and the forward movement of the rear wheels 48 of semi-trailer 12 being generally equal to the difference between distance X and distance Y.

From the hoisted position shown in FIG. 6, one or both of the rear wheels 48 of semi-trailer 12 may be secured with a brace 66 (as shown in FIG. 1 and FIG. 7) in order to secure the semi-trailer 12 in the second semi-trailer location and to inhibit semi-trailer 12 from moving in the rearwardly direction as indicated by the arrowed line E in FIG. 6. From the hoisted position semi-trailer 12 may then be moved via hoist mechanism 60 to the lowered position as shown in FIG. 7 thereby urging towing vehicle 13 forwardly in the direction indicated by the arrowed line F from the first towing vehicle location to a second towing vehicle location a distance generally equal to the difference between distance Y and distance X, thereby resulting in the total movement of refuse collection vehicle 10 in the forwardly direction to an unstuck location indicated the arrowed line F in FIG. 7 a distance equal generally to the difference between distance X and distance Y.

The foregoing operation described in combination with FIGS. 5–7 may be repeated as shown in FIGS. 8–10 in the event the rear wheels 23 of towing vehicle 13 are stuck or otherwise mired from moving either in the forwardly direction or the rearwardly direction resulting in refuse collection vehicle 10 being in a stuck location. In this regard, in FIG. 8 rear wheels 23 of towing vehicle 13 are shown positioned and stuck within a trench 90. With refuse collection vehicle 10 in a stuck position as shown in FIG. 8, brace 66 may be positioned behind one of the front wheels 22 of towing vehicle in a manner consistent with that previously described, thereby securing towing vehicle 13 in a first towing vehicle location for inhibiting towing vehicle 13 from moving in the rearwardly direction as indicated by the arrowed line G in FIG. 8. Once towing vehicle 13 is properly secured in the first towing vehicle location, semi-trailer 12 may then be moved from a first semi-trailer location via hoist mechanism 60 from the lowered position in FIG. 8 to the raised or hoisted position as shown in FIG. 9. In the lowered position as shown in FIG. 5, the distance between the rear wheels 48 of semi-trailer 12 and the rear wheels 23 of towing vehicle 13 is generally defined by the distance X. Furthermore, in the raised or hoisted position as shown in FIG. 9, the distance between the rear wheels 48 of semi-trailer 12 and the rear wheels 23 of towing vehicle 13 is generally defined by the distance Y, distance X being greater than distance Y. Thus, with towing vehicle secured in the first towing vehicle location via brace 66, upon actuation of hoist mechanism 60 from the lowered position of semi-trailer 12, rear wheels 48 of semi-trailer 12 are pulled forwardly toward the rear wheels 23 of towing vehicle 13 in the direction indicated by the arrowed line H in FIG. 9 until semi-trailer 12 is positioned in a second semi-trailer location defined as the hoisted position of semi-trailer 12 with the rear wheels 48 of semi-trailer 12 located the distance Y apart from rear wheels 23 of towing vehicle 13, the forward movement of the rear wheels 48 of semi-trailer 12 being generally equal to the difference between distance X and distance Y.

From the hoisted position shown in FIG. 8, one or both of the rear wheels 48 of semi-trailer 12 may be secured with a brace 66 in order to secure the semi-trailer 12 in the second semi-trailer location and to inhibit semi-trailer 12 from moving in the rearwardly direction as indicated by the arrowed line I in FIG. 9. From the hoisted position semi-trailer 12 may then be moved via hoist mechanism 60 to the lowered position as shown in FIG. 10 thereby urging towing vehicle 13 forwardly in the direction indicated by the arrowed line F from the first towing vehicle location to a second towing vehicle location a distance generally equal to the difference between distance Y and distance X, thereby resulting in the rear wheels 23 of towing vehicle moving forwardly out of trench 90 in the direction indicated by the arrowed line J with the total forward movement of refuse collection vehicle 10 to an unstuck location in FIG. 10 being a distance equal generally to the difference between distance X and distance Y.

An operation similar to the foregoing operation described in combination with FIGS. 8–10 may be carried out as shown in FIGS. 11–13 in the event the front wheels 22 of towing vehicle 13 are stuck or otherwise mired from moving either in the forwardly direction or the rearwardly direction resulting in refuse collection vehicle 10 being stuck. In this regard, in FIG. 11 refuse collection vehicle 10 is shown in a stuck location with front wheels 22 of towing vehicle 13 positioned and stuck within a trench 91 with towing vehicle 13 shown in a first towing vehicle location. From the configuration shown in FIG. 11, semi-trailer 12 may then be moved from a first semi-trailer location via hoist mechanism 60 from the lowered position to the raised or hoisted position as shown in FIG. 12. Consistent with the foregoing discussions, in the lowered position as shown in FIG. 11, the distance between the rear wheels 48 of semi-trailer 12 and the rear wheels 23 of towing vehicle 13 is generally defined by the distance X. Furthermore, in the raised or hoisted position as shown in FIG. 12, the distance between the rear wheels 48 of semi-trailer 12 and the rear wheels 23 of towing vehicle 13 is generally defined by the distance Y, distance X being greater than distance Y. Thus, with towing vehicle in the first towing vehicle location, upon actuation of hoist mechanism 60 from the lowered position of semi-trailer 12, rear wheels 48 of semi-trailer 12 are pulled forwardly toward the rear wheels 23 of towing vehicle 13 in the direction indicated by the arrowed line K in FIG. 12 until semi-trailer 12 is positioned in a second semi-trailer location defined as the hoisted position of semi-trailer 12 with the rear wheels 48 of semi-trailer 12 located the distance Y apart from rear wheels 23 of towing vehicle 13, the forward movement of the rear wheels 48 of semi-trailer 12 being generally equal to the difference between distance X and distance Y.

Unlike prior discussions, brace 66 was not employed in FIG. 11 and FIG. 12 to secure towing vehicle 13 in the first towing vehicle location prior to and throughout the movement of semi-trailer 12 from the lowered position to the hoisted position. With front wheels 22 of towing vehicle 13 stuck within trench 91 causing refuse collection vehicle 10 to be stuck, it may not be necessary, as in FIG. 11 and FIG. 12, to secure towing vehicle 13 with brace prior to and during the movement of semi-trailer from the lowered position to the hoisted position if, by virtue of being stuck, towing vehicle 13 is otherwise inhibited from moving in the rearwardly direction as indicated by the arrowed line L in FIG. 12.

Nevertheless, from the hoisted position shown in FIG. 8, one or both of the rear wheels 48 of semi-trailer 12 may be secured with a brace 66 in order to secure the semi-trailer 12 in the second semi-trailer location and to inhibit semi-trailer 12 from moving in the rearwardly direction as indicated by the arrowed line L in FIG. 12. From the hoisted position semi-trailer 12 may then be moved via hoist mechanism 60 to the lowered position as shown in FIG. 13 thereby urging towing vehicle 13 forwardly in the direction indicated by the arrowed line F from the first towing vehicle location to a second towing vehicle location a distance generally equal to the difference between distance Y and distance X, thereby resulting in the front wheels 22 of towing vehicle moving forwardly out of trench 91 in the direction indicated by the arrowed line M with the total forward movement of refuse collection vehicle 10 to an unstuck location in FIG. 13 being a distance equal to the difference between distance X and distance Y.

In summary, the present invention provides a new and improved method for moving refuse collection vehicle 10 from a first stuck location to a second unstuck location via hoist mechanism 60. Because the instant method may be carried out only by the operator of the truck with no outside assistance, the present method is convenient and easy to implement thereby minimizing downtime associated with the refuse collection vehicle 10 becoming stuck.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of moving a vehicle comprising the steps of:

providing a vehicle including the steps of, providing a towing vehicle having a chassis with a forward end directed in a forwardly direction, a rearward end directed in a rearwardly direction and a frame supported above ground level by front wheels positioned proximate the forward end of the chassis and rear wheels positioned proximate the rearward end of the chassis, providing a semi-trailer having a trailer chassis with a forward end, a rearward end and a trailer frame supported above ground level by rear wheels positioned proximate the rearward end of the trailer chassis and a landing gear carried by the trailer frame at a point intermediate the forward end and the rearward end of the trailer frame, interconnecting the towing vehicle to the semi-trailer with a hoist mechanism operative for moving the semi-trailer between a normal lowered position defining a distance X between the rear wheels of the semi-trailer and the rear wheels of the towing vehicle, and a hoisted position defining a distance Y between the rear wheels of the semi-trailer and the rear wheels of the towing vehicle, distance X being greater than distance Y;

securing said towing vehicle in a first towing vehicle location to inhibit said towing vehicle from moving in the rearwardly direction;

moving the semi-trailer from the normal lowered position to the hoisted position thereby moving the rear wheels of the semi-trailer from a first semi-trailer location to a second semi-trailer location a distance equal generally to the difference between the distance X and the distance Y;

securing the semi-trailer in the second semi-trailer location to inhibit the semi-trailer from moving in the rearwardly direction; and moving the semi-trailer from the hoisted position to the normal lowered position thereby moving the towing vehicle in the forwardly direction from the first towing vehicle location to a second towing vehicle location a distance equal generally to the difference between the distance X and the distance Y, the total movement of said vehicle in the forwardly direction being equal generally to the difference between the distance X and the distance Y.

2. The method of claim 1, wherein said step of securing said towing vehicle in a first towing vehicle location further includes the steps of:

providing a brace; and placing the brace against said towing vehicle for inhibiting said towing vehicle from moving in the rearwardly direction.

3. The method of claim 2, wherein said step of placing the brace against said towing vehicle further includes the step of placing said brace rearwardly of and against one of the front wheels of said towing vehicle.

4. The method of claim 2, wherein said step of placing the brace against said towing vehicle further includes the step of placing said brace rearwardly of and against one of the rear wheels of said towing vehicle.

5. The method of claim 1, wherein said step of securing the semi-trailer in the second semi-trailer location further includes the steps of:

providing a brace; and placing the brace against said semi-trailer for inhibiting said semi-trailer from moving in the rearwardly direction.

6. The method of claim 5, wherein said step of placing the brace against said semi-trailer further includes the step of placing said brace rearwardly of and against one of the rear wheels of said semi-trailer.

7. For use with a vehicle of a type having a towing vehicle including a chassis having a forward end directed toward a forwardly direction, a rearward end directed toward a rearwardly direction and a frame supported above ground level by front wheels positioned proximate the forward end of the chassis and rear wheels positioned proximate the rearward end of the chassis, a semi-trailer including a trailer chassis having a forward end, a rearward end and a trailer frame supported above ground level by rear wheels positioned proximate the rearward end of the trailer chassis and a landing gear carried by the trailer frame at a point intermediate the forward end and the rearward end of the trailer frame, and a hoist mechanism interconnecting the towing vehicle to the semi-trailer operative for moving the semi-trailer between a normal lowered position defining a distance X between the rear wheels of the semi-trailer and the rear wheels of the towing vehicle, and a hoisted position defining a distance Y between the rear wheels of the semi-trailer and the rear wheels of the towing vehicle, distance X being greater than distance Y, a method of moving the vehicle comprising the steps of:

securing said towing vehicle in a first towing vehicle location to inhibit said towing vehicle from moving in the rearwardly direction;

moving the semi-trailer from the normal lowered position to the hoisted position thereby moving the rear wheels of the semi-trailer from a first semi-trailer location to a second semi-trailer location a distance equal generally to the difference between the distance X and the distance Y;

securing the semi-trailer in the second semi-trailer location to inhibit the semi-trailer from moving in the rearwardly direction; and moving the semi-trailer from the hoisted position to the normal lowered position thereby moving the towing vehicle in the forwardly direction from the first towing vehicle location to a second towing vehicle location a distance equal generally to the difference between the distance X and the distance Y, the total movement of the vehicle in the forwardly direction being equal generally to the difference between the distance X and the distance Y.

8. The method of claim 7, wherein said step of securing said towing vehicle in a first towing vehicle location further includes the steps of:

providing a brace; and placing the brace against said towing vehicle for inhibiting said towing vehicle from moving in the rearwardly direction.

9. The method of claim 8, wherein said step of placing the brace against said towing vehicle further includes the step of placing said brace rearwardly of and against one of the front wheels of said towing vehicle.

10. The method of claim 8, wherein said step of placing the brace against said towing vehicle further includes the step of placing said brace rearwardly of and against one of the rear wheels of said towing vehicle.

11. The method of claim 7, wherein said step of securing the semi-trailer in the second semi-trailer location further includes the steps of:

providing a brace; and placing the brace against said semi-trailer for inhibiting said semi-trailer from moving in the rearwardly direction.

12. The method of claim 11, wherein said step of placing the brace against said semi-trailer further includes the step of placing said brace rearwardly of and against one of the rear wheels of said semi-trailer.

* * * * *